United States Patent [19]

White

[11] Patent Number: 5,764,705
[45] Date of Patent: Jun. 9, 1998

[54] ADAPTIVE PHASE SHIFT ADJUSTER FOR RESONATOR

[75] Inventor: Stanley A. White, San Clemente, Calif.

[73] Assignee: Boeing North American, Inc., Seal Beach, Calif.

[21] Appl. No.: 683,643

[22] Filed: Jul. 15, 1996

[51] Int. Cl.⁶ .................................................. H04L 27/22
[52] U.S. Cl. ...................... 375/324; 375/332; 329/304; 329/367
[58] Field of Search ................................. 375/269, 270, 375/321, 324–327, 329, 332; 329/304, 352, 356, 367

[56] References Cited

U.S. PATENT DOCUMENTS

| | | | |
|---|---|---|---|
| 4,893,316 | 1/1990 | Janc et al. | 364/724.011 |
| 5,089,822 | 2/1992 | Abaunza et al. | 342/30 |
| 5,369,500 | 11/1994 | Jacobs | 358/406 |
| 5,487,015 | 1/1996 | White | 364/484 |
| 5,550,866 | 8/1996 | White | 375/316 |
| 5,559,828 | 9/1996 | Armstrong et al. | 375/200 |
| 5,577,073 | 11/1996 | White | 375/324 |
| 5,638,399 | 6/1997 | Schuchman et al. | 375/202 |

*Primary Examiner*—Young T. Tse
*Attorney, Agent, or Firm*—Tom Streeter

[57] ABSTRACT

The in-phase channel 28 of a complex demodulated resonator data output signal 12 should contain all of the sensed information, and the quadrature-phase channel 32 should contain none of it. This will not happen if the phase of the reference signal 14 is incorrect. The phase may be adjusted by first filtering each demodulated channel with a respective low-pass dc-blocked filter 34, 38 which passes only the frequencies of the sensed information. If the sensed information gets through on both channels, then there will be a non-zero cross-correlation between the channels. This cross-correlation can be servoed to a minimum by use of a feedback signal 22. Doing so will cause all of the sensed information to be in one channel 28, and diagnostic information to be in the other channel 32.

20 Claims, 2 Drawing Sheets

ADAPTIVE PHASE SHIFT ADJUSTER FOR RESONATOR

BACKGROUND OF THE INVENTION

This invention relates to amplitude demodulation of an output signal from a resonator, and has particular relation to correctly adjusting the phase between the output signal and the demodulation reference signal.

A sensor can have a resonator as its heart. The resonator is driven with a known periodic drive signal. The drive signal preferably has a frequency at or close to the natural frequency of the resonator, and preferably has a shape which is a sinusoid with constant amplitude. Other frequencies and shapes can be used depending on the application, but such alternative applications will be very rare.

The resonator responds to the drive signal by producing a data output signal which is a quadrature amplitude modulated (QAM) double-sideband suppressed-carrier (DSBSC) modulation of the drive signal. The output signal depends on the drive signal, of course, and it depends on the parameters of the resonator, but these are known. Indeed, over short periods of time, they may productively be considered to be fixed. What is both unknown and variable (often highly variable) is some information which the sensor is designed to sense.

Applicant is an inventor or co-inventor of many innovations concerning the Digital Quartz Inertial Measurement Unit, or DQI. The following patents and applications also pertain to the DQI, and the disclosure thereof is incorporated herein by reference:

| U.S. Pat. No. | Title | Issue Date |
| --- | --- | --- |
| 5,179,380 | One-Bit Sigma-Delta Modulator with Improved Signal Stability | 01/12/93 |
| 5,339,263 | Decimator/Interpolator Filter for ADC and DAC | 08/16/94 |
| 5,361,036 | Complex Digital Demodulator Employing Chebychev-Approximation Derived Synthetic-Sinusoid Generator | 11/01/94 |
| 5,400,269 | Closed-Loop Baseband Controller for a Rebalance Loop of a Quartz Angular-Rate Sensor | 03/21/95 |
| 5,444,639 | Angular-Rate-Sensing System and Method with Digital Synthesizer and Variable-Frequency Oscillator | 08/22/95 |
| 5,444,641 | Admittance-Parameter Estimator for a Piezoelectric Resonator in an Oscillator Circuit | 08/22/95 |
| 5,459,432 | Use of a Chopper and a Sigma-Delta Modulator for Downconverting and Digitizing an Analog Signal Including Information Modulated by a Carrier | 10/17/95 |
| 5,463,575 | Reduced Quantization Noise from a Single-Precision Multiplier | 10/31/95 |
| 5,471,396 | Estimator of Amplitude and Frequency of a Noisy Biased Sinusoid from a Short Burst of Samples | 11/28/95 |
| 5,487,015 | Self-Oscillating Driver circuit for a Quartz Resonator of an Angular-Rate Sensor | 01/23/96 |
| 5,491,725 | A Tracking Filter and Quadrature Phase-Reference Generator | 02/13/96 |
| 5,550,866 | A Demodulator/Reference Generator Based on Two Cascaded Hilbert Transformers | 08/27/96 |
| 5,566,093 | Sensor with Resonator, Digital Filter, and Display | 10/15/96 |
| 5,576,976 | Amplitude Detection and Automatic Gain Control of a Spread Sampled Sinusoid by Adjustment of a Notch Filter | 11/19/96 |
| 5,577,073 | A Frequency and Phase-Locked Two-Phase Digital Synthesizer | 11/19/96 |
| 5,675,498 | Measuring Amplitude of Sparsely Sampled Sinusoidal Signal | 10/7/97 |
| 5,732,003 | Sawtooth Phase Filter | 3/24/98 | and in the following U.S. patent applications:

| Ser. No. | Title | File Date |
| --- | --- | --- |
| 08/120,871 | Amplitude Detection and Automatic Gain Control of a Sparsely Sampled Sinusoid by Computation Including a Hilbert Transform | 09/07/93 |
| 08/676,653 | Decimating IIR Filter | 07/02/96 |

In the DQI, the sensed information is the angular rate of rotation, but other resonators could just as easily be designed to respond to information about any of a number of other sensed parameters: temperature, viscosity, or anything else.

The sensed information that we want to extract has amplitude-modulated the drive signal $\cos(\omega_d t)$; that should be the sensor output signal, $y(t)=x(t) \cos(\omega_d t)$, where $x(t)$ is the sensor input signal (a direct indication of angular rate, viscosity, etc.) and $\omega_d$ is the drive frequency. In order to extract the sensed information one could therefore (ideally) demodulate the sensor output signal using the drive signal as the reference.

There are some flaws with this reasoning. The sensor output signal is really $$y(t)=[x(t)+A] \cos(\omega_d t+\phi)+B \sin(\omega_d t+\phi).$$

A and B drift some with temperature and aging, but that is another problem. The problem at hand is that $\phi$ drifts with temperature and aging, too. The object of the present invention is to automatically track changes in $\phi$.

As is conventional in the art, demodulation of the resonator data output signal is complex. That is, the resonator data output signal is separately multiplied by two periodic signals (generally sinusoids) which are known to be in quadrature. The first is called the in-phase reference signal, and the second is called the quadrature-phase reference signal. This multiplication thereby produces an in-phase product signal and a quadrature-phase product signal. It is possible to rotate $\phi$ by an amount $\Delta\phi$ through conventional processing of a raw resonator reference signal. Determining $\Delta\phi$, however, and especially determining $\Delta\phi$ automatically, is not a trivial exercise.

SUMMARY OF THE INVENTION

Applicant has solved this problem by noting the desired result: the in-phase channel contains all of the sensed information $x(t)$, and the quadrature-phase channel contains none of it. Both channels are filtered with a filter which passes only the frequencies of the sensed information. If information gets through on both channels, then there will be a non-zero cross-correlation between the channels. This cross-correlation can be servoed to a minimum by adjusting $\Delta\phi$. It may not be possible to servo it to zero, since correlated noise may appear on both channels regardless of the chosen phase. When the cross-correlation is minimized, however, all of the sensed information will be in one channel, and diagnostic information will be in the other channel.

The feedback signal necessary to do this generally will not allocate the channels (in-phase to sensed information and quadrature-phase to diagnostic information, or vice versa) at random. If the feedback signal is zero at power-up, it will regularly make the same allocation for the same resonator. It may take some time to do this, however. In some applications, therefore, the feedback signal is initialized at some predetermined number. This number is the feedback signal at which the system is expected to stabilize. The expectation may be the result of experience, calculations, or both.

DETAILED DESCRIPTION OF THE DRAWINGS

Figure 1:
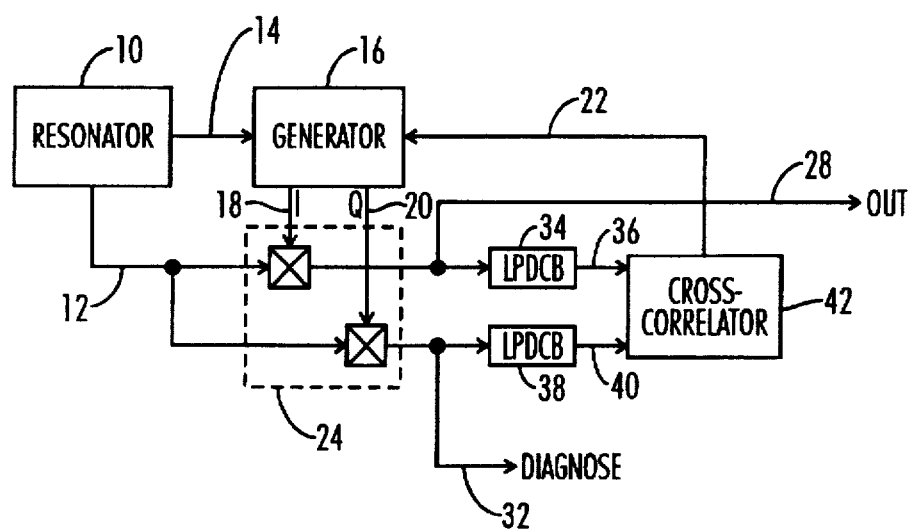
FIG. 1 is an overall schematic diagram of the present invention.

In FIG. 1, a resonator 10 produces a resonator data output signal 12 and a resonator reference signal 14. The resonator reference signal has a frequency $f_o$, perhaps 10 KHz. The resonator data output signal has a passband centered at $f_o$ and a width of 2$\Delta f$, where $\Delta f$ is perhaps 10 Hz.

The resonator reference signal 14 is ideally the signal which drives the resonator 10. If it is a signal which is taken from (rather than applied to) the resonator 10, then it should contain as little of the information (angular rate, viscosity, etc.) sensed by the resonator 10 as possible.

The resonator reference signal 14 drives a rotated complex demodulation reference signal generator 16. This generator 16 is so called because it generates a signal by which the resonator data output signal 12 may be demodulated. It is a complex signal generator because it has two separate components, an in-phase reference signal 18 and a quadrature-phase reference signal 20. It is a rotated signal generator because these two components 18, 20 may be rotated to any desired phase with respect to the resonator reference signal 14.

The rotated complex demodulation reference signal generator 16 is also connected to receive a feedback signal 22. The generator 16 is constructed such that the amount of rotation of the in-phase reference signal 18 and the quadrature-phase reference signal 20 with respect to the resonator reference signal 14 is a response to the feedback signal 22.

The reference signals 18, 20 are applied to a complex amplitude demodulator 24. This demodulator 24 includes an in-phase demodulation multiplier 26 connected to multiply the in-phase reference signal 18 by the resonator data output signal 12 and to thereby produce an in-phase demodulated output signal 28. It also includes a quadrature-phase demodulation multiplier 30 connected to multiply the quadrature-phase reference signal 20 by the resonator data output signal 12 and to thereby produce a quadrature-phase demodulated output signal 32.

An in-phase low-pass dc-blocked (LPDCB) filter 34 is connected to receive the in-phase demodulated output signal 28 and to thereby produce an LPDCB filtered in-phase signal 36. The in-phase LPDCB filter 34 has an upper pass-band-edge of $\Delta f$.

A quadrature-phase LPDCB filter 38 has a frequency response identical to that of the in-phase LPDCB filter 34. It is connected to receive the quadrature-phase output signal 32 and to thereby produce an LPDCB filtered quadrature-phase signal 40.

A cross-correlator 42 is connected to receive the LPDCB filtered in-phase signal 36 and the LPDCB filtered quadrature-phase signal 40. It thereby produces the feedback signal 22. The feedback signal 22 is responsive to a cross-correlation between the LPDCB filtered in-phase signal 36 and the LPDCB filtered quadrature-phase signal 40. The cross-correlator 42 is connected to apply the feedback signal 22 to the rotated complex demodulation reference signal generator 16.

Figure 2:
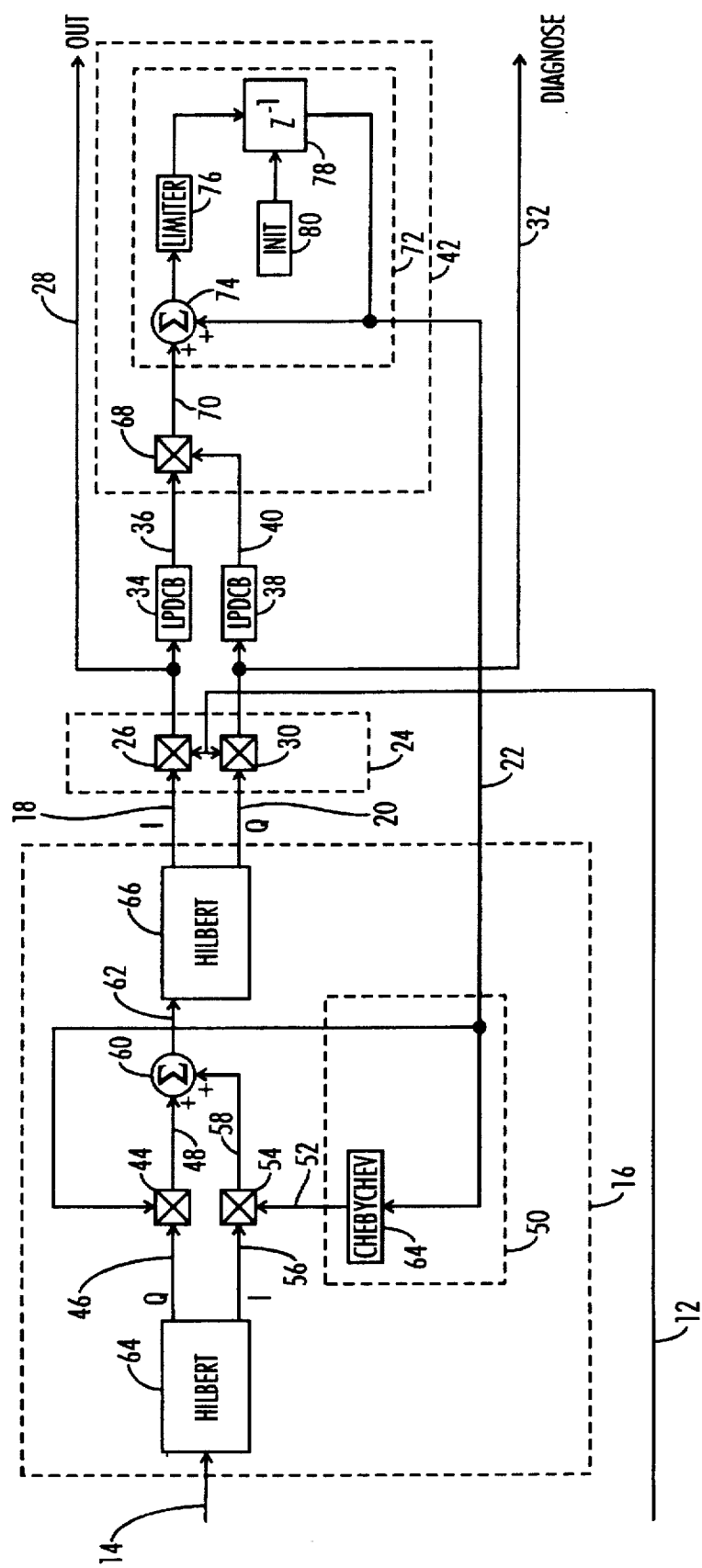
FIG. 2 is a more detailed schematic diagram of a preferred embodiment of the present invention.

FIG. 2 is a more detailed schematic diagram of a preferred embodiment of the present invention. The rotated complex demodulation reference signal generator 16 is seen as applying the feedback signal 22 to a quadrature-phase rotation multiplier 44. The quadrature-phase rotation multiplier 44 is also connected to receive a raw quadrature-phase signal 46, and to thereby produce a quadrature-phase product signal 48.

A calculator 50 is constructed to construe the feedback signal 22 as a scaled sine signal, and to convert it to a scaled cosine signal 52. It applies the scaled cosine signal 52 to an in-phase rotation multiplier 54. The in-phase rotation multiplier 54 is also connected to receive a raw in-phase signal 56, and to thereby produce an in-phase product signal 58.

A rotation summer 60 is connected to sum the in-phase product signal 58 and the quadrature-phase product signal 48, and to thereby produce a summed product signal 62.

The calculator 50 is preferably constructed to produce the scaled cosine signal 52 by using a Chebechev approximator 64. No further processing of the feedback signal 22 is needed before it is applied to quadrature-phase rotation multiplier 44. In principle, however, any calculator 50 could be used if its outputs, when applied to the rotation multipliers 44, 54, would be treated by these multipliers as, respectively, the properly scaled sine and cosine of a suitable phase adjustment angle. The cross-correlator 42 will servo the implicit phase angle correction to whatever is needed to minimize the cross-correlation.

A first Hilbert transformer 64 may conveniently be connected to receive the resonator reference signal 14 and to thereby produce the raw in-phase signal 56 and the raw quadrature-phase signal 46. Likewise, a second Hilbert transformer 66 may conveniently be connected to receive the summed product signal 62 and to thereby produce the in-phase reference signal 18 and the quadrature-phase reference signal 20.

The cross-correlator 42 may conveniently include a cross-correlation multiplier 68 connected to multiply together the LPDCB filtered in-phase demodulated signal 36 and the LPDCB filtered quadrature-phase demodulated signal 40 and to thereby produce a cross-correlation product signal 70. An integrator 72 is connected to integrate the cross-correlation product signal 70, an output of the integrator 72 being the feedback signal 22. A suitable integrator 72 typically includes a feedback loop of a summer 74, a limiter 76 (to eliminate absurd values of a feedback signal 22; what constitutes "absurd" will vary with the application), and a delay element 78.

When the LPDCB filtered in-phase signal 36 and the LPDCB filtered quadrature-phase signal 40 are uncorrelated, then the cross-correlation product signal 70 will settle in a narrow band centered at zero. On average, then, there will be no change to the feedback signal 22. This happens over brief periods of time and stable temperatures. With more extensive delays and temperature fluctuations, the correct phase shift changes, and the previously uncorrelated LPDCB filtered in-phase signal 36 and the LPDCB filtered quadrature-phase signal 40 become cross-correlated, either positively or negatively. This cross-correlation appears as a non-zero value of the cross-correlation product signal 70, and this non-zero value is added to the feedback signal 22 with each clock cycle. When the phase angle implicit in the feedback signal 22 has been adjusted sufficiently to decorrelate the signals 36, 40, the value of the cross-correlation product signal 70 returns to zero (at least approximately), and the feedback signal 22 again stabilizes.

As noted above, the feedback signal 22 generally will not allocate the channels (in-phase 26 to information signal 28 and quadrature-phase 30 to diagnostic signal 32, or vice versa) at random. If the feedback signal 22 is zero at power-up, it will regularly make the same allocation for the same resonator 10. It may take some time to do this, however. The cross-correlator 42 may therefore further include an initializer 80 constructed to initialize the feedback signal 22 with a predetermined number if speed-to-stabilization is important in the application at hand. Also as noted above, this number is the feedback signal 22 at which the system is expected to stabilize. The expectation may be the result of experience, calculations, or both.

FIG. 2 shows the initializer 80 as injecting the number into the register of the delay unit 78, and this is the preferred structure. Alternatively, an additional summer in the feedback loop of the integrator 72, or even between the integrator 72 and the calculator 50, could be used. Equivalently, the initializer could be built into the calculator 50.

SCOPE OF THE INVENTION

Several specific embodiments of the present invention have been disclosed herein, but the true spirit and scope of the present invention are not limited thereto. Such limitations are imposed only by the appended claims and their equivalents.

What is claimed is:

1. Apparatus for complex amplitude demodulating a resonator data output signal with respect to a resonator reference signal, the resonator reference signal having a frequency $f_0$, and the resonator data output signal having a passband centered at $f_0$ with a bandwidth of $2\Delta f$, the apparatus comprising:

(a) a rotated complex demodulation reference signal generator connected to receive the resonator reference signal and a feedback signal and to thereby generate an in-phase reference signal and a quadrature-phase reference signal, the amount of rotation of the in-phase reference signal and the quadrature-phase reference signal with respect to the resonator reference signal being constructed to respond to the feedback signal;

(b) a complex amplitude demodulator comprising:
       (1) an in-phase demodulation multiplier connected to multiply the in-phase reference signal by the resonator data output signal and to thereby produce an in-phase demodulated output signal; and
       (2) a quadrature-phase demodulation multiplier connected to multiply the quadrature-phase reference signal by the resonator data output signal and to thereby produce a quadrature-phase demodulated output signal;

(c) an in-phase low pass dc-blocked (LPDCB) filter connected to receive the in-phase demodulated output signal and to thereby produce an LPDCB filtered in-phase signal, the in-phase LPDCB filter having an upper pass-band-edge frequency of $\Delta f$;

(d) a quadrature-phase LPDCB filter connected to receive the quadrature-phase demodulated output signal and to thereby produce a LPDCB filtered quadrature-phase signal, the quadrature-phase LPDCB filter having a response identical to that of the in-phase LPDCB filter; and (e) a cross-correlator:
       (1) connected to receive the LPDCB filtered in-phase signal and the LPDCB filtered quadrature-phase signal and to thereby produce the feedback signal, the feedback signal being responsive to a cross-correlation between the LPDCB filtered in-phase signal and the LPDCB filtered quadrature-phase signal; and
       (2) connected to apply the feedback signal to the rotated complex demodulation reference signal generator.

2. The apparatus of claim 1, wherein the rotated complex demodulation reference signal generator:

(a) is constructed to apply the feedback signal to a quadrature-phase rotation multiplier, which is also connected to receive a raw quadrature-phase signal, and to thereby produce a quadrature-phase product signal;
    (b) includes a calculator constructed to:
       (1) construe the feedback signal as a scaled sine signal; and
       (2) convert it to a scaled cosine signal;
    (c) is constructed to apply the scaled cosine signal to an in-phase rotation multiplier, which is also connected to receive a raw in-phase signal, and to thereby produce an in-phase product signal; and
    (d) includes a rotation summer connected to sum the in-phase product signal and the quadrature-phase product signal, and to thereby produce a summed product signal.

3. The apparatus of claim 2, wherein the calculator is constructed to produce a Chebechev approximation scaled cosine signal.

4. The apparatus of claim 3, wherein the cross-correlator comprises:

(a) a cross-correlation multiplier connected to multiply together the LPDCB filtered in-phase signal and the LPDCB filtered quadrature-phase signal and to thereby produce a cross-correlation product; and
    (b) an integrator connected to integrate the cross-correlation product, an output of the integrator being the feedback signal.

5. The apparatus of claim 4, wherein the cross-correlator further comprises an initializer constructed to initialize the feedback signal with a predetermined number.

6. The apparatus of claim 3, wherein the cross-correlator further comprises an initializer constructed to initialize the feedback signal with a predetermined number.

7. The apparatus of claim 2, wherein the cross-correlator further comprises an initializer constructed to initialize the feedback signal with a predetermined number.

8. The apparatus of claim 2, wherein the rotated complex demodulation reference signal generator comprises:

(a) a first Hilbert transformer connected to receive the resonator reference signal and to thereby produce the raw in-phase signal and the raw quadrature-phase signal; and
    (b) a second Hilbert transformer connected to receive the summed product signal and to thereby produce the in-phase reference signal and the quadrature-phase reference signal.

9. The apparatus of claim 8, wherein the calculator is constructed to produce a Chebechev approximation scaled cosine signal.

10. The apparatus of claim 9, wherein the cross-correlator comprises:

(a) a cross-correlation multiplier connected to multiply together the LPDCB filtered in-phase signal and the LPDCB filtered quadrature-phase signal and to thereby produce a cross-correlation product; and (b) an integrator connected to integrate the cross-correlation product, an output of the integrator being the feedback signal.

11. The apparatus of claim 10, wherein the cross-correlator further comprises an initializer constructed to initialize the feedback signal with a predetermined number.

12. The apparatus of claim 9, wherein the cross-correlator further comprises an initializer constructed to initialize the feedback signal with a predetermined number.

13. The apparatus of claim 8, wherein the cross-correlator comprises:

(a) a cross-correlation multiplier connected to multiply together the LPDCB filtered in-phase signal and the LPDCB filtered quadrature-phase signal and to thereby produce a cross-correlation product; and (b) an integrator connected to integrate the cross-correlation product, an output of the integrator being the feedback signal.

14. The apparatus of claim 13, wherein the cross-correlator further comprises an initializer constructed to initialize the feedback signal with a predetermined number.

15. The apparatus of claim 8, wherein the cross-correlator further comprises an initializer constructed to initialize the feedback signal with a predetermined number.

16. The apparatus of claim 2, wherein the cross-correlator comprises:

(a) a cross-correlation multiplier connected to multiply together the LPDCB filtered in-phase signal and the LPDCB filtered quadrature-phase signal and to thereby produce a cross-correlation product; and (b) an integrator connected to integrate the cross-correlation product, an output of the integrator being the feedback signal.

17. The apparatus of claim 16, wherein the cross-correlator further comprises an initializer constructed to initialize the feedback signal with a predetermined number.

18. The apparatus of claim 1, wherein the cross-correlator comprises:

(a) a cross-correlation multiplier connected to multiply together the LPDCB filtered in-phase signal and the LPDCB filtered quadrature-phase signal and to thereby produce a cross-correlation product; and (b) an integrator connected to integrate the cross-correlation product, an output of the integrator being the feedback signal.

19. The apparatus of claim 18, wherein the cross-correlator further comprises an initializer constructed to initialize the feedback signal with a predetermined number.

20. The apparatus of claim 1, wherein the cross-correlator further comprises an initializer constructed to initialize the feedback signal with a predetermined number.

* * * * *